May 4, 1948. G. B. BENANDER 2,440,924
CORD SET AND JUNCTION BLOCK THEREFOR
Filed May 13, 1946
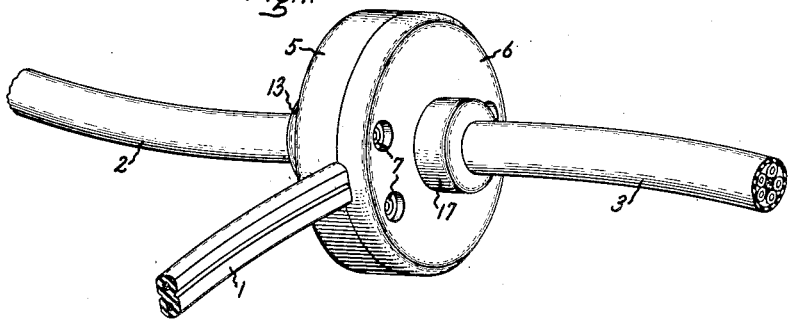
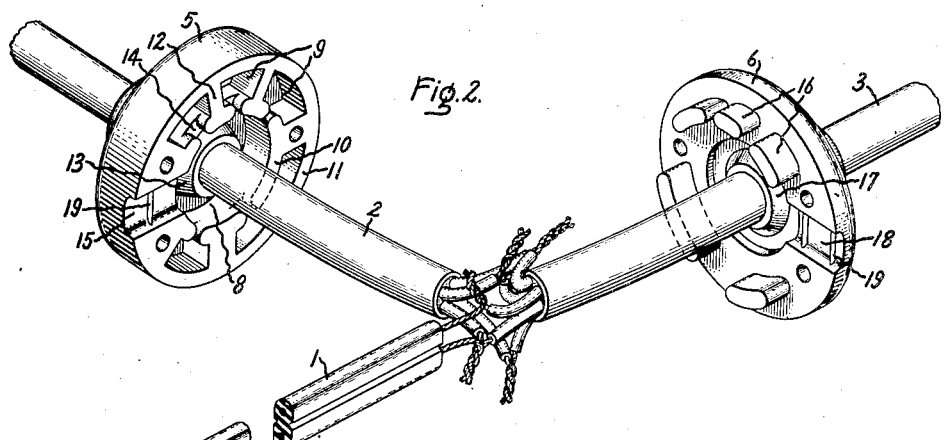
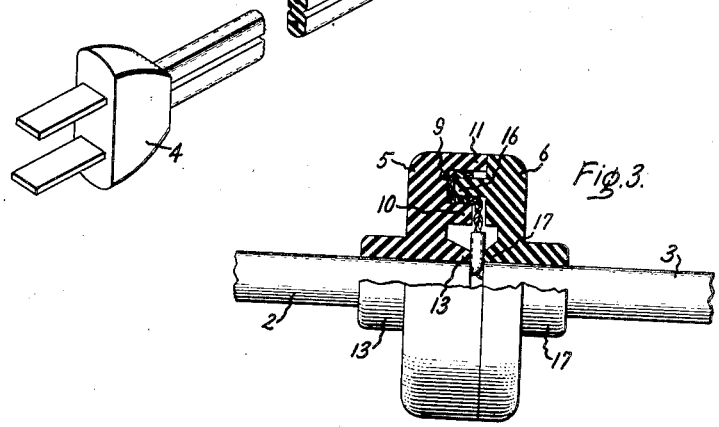
Inventor:
George B. Benander,
by Alfred V. Robt.
His Attorney.

Patented May 4, 1948

2,440,924

UNITED STATES PATENT OFFICE 2,440,924

CORD SET AND JUNCTION BLOCK THEREFOR

George B. Benander, Oaklawn, R. I., assignor to Monowatt Electric Corporation, a corporation of Connecticut Application May 13, 1946, Serial No. 669,422

1 Claim. (Cl. 174—71)

The present invention relates to cord sets comprising a plurality of multiple conductor cables, the wires or conductors of which at one end are connected together, and to junction blocks for effecting such connections.

An object of the invention is to provide a cord set having an improved junction block which is simple in structure, small, compact and comprises a minimum number of parts.

A further object is to provide a junction block wherein the conductors or wires are connected in a satisfactory manner without the use of binding posts or screws.

A further object is to provide a junction block wherein the wires can be quickly and easily assembled at low cost.

For a consideration of what I believe to be novel and my invention, attention is directed to the following specification and to the claims appended thereto.

In the drawing, Fig. 1 is a perspective view of a portion of a cord set comprising three cables connected together by a junction block embodying my invention; Fig. 2 is an exploded perspective view showing the parts of the junction block and illustrating the manner in which the wires of the cables are connected, and Fig. 3 is a side elevation, partly in section, of the junction block with the cable ends positioned therein.

Referring to the drawing, 1, 2 and 3 indicate three cables, the wires or conductors of which are joined to provide a cord set. Cable 1 is shown as comprising two wires. It is the power cable and is shown as being provided at its free end with a plug cap 4 by means of which it may be connected to a wall receptacle. Cables 2 and 3 are shown as comprising four and five wires respectively and may be connected with apparatus of any suitable type. In the present instance, the cord set is intended for use with an electric blanket and cables 2 and 3 may be connected with the blanket and the control box either directly or by the use of suitable detachable connectors.

The junction block is in the form of a disk and comprises a base 5 and a cap 6 connected together permanently by rivets 7. Base 5 has walls which define a central wire terminal chamber 8 which is surrounded by a circumferential ring of pockets 9, there being five pockets in the present instance. Chamber 8 is defined by an inner wall 10 concentric with and spaced from the outer wall 11 of the base and pockets 9 are defined by radial partition walls 12 located between walls 10 and 11. At the center of the base is a hub 13 which defines an opening through which a conductor end may be brought into the block. Hub 13 projects beyond the outer wall of base 5 and also well into chamber 8. In wall 10 are grooves 14 which connect chamber 8 with pockets 9. The bottom walls of grooves 14 are about flush with the inner end of hub 13. One radial partition wall 12 is relatively wide and is provided with a groove 15 through which a cable end may be brought radially into chamber 8.

Cap 6 is provided with a ring of circumferentially spaced projections 16 adapted to fit into pockets 9. They are of a thickness and depth such that they will clamp tightly in the pockets 9 the twisted together ends of cable wires as shown particularly in Fig. 3. Cap 6 is provided also with a hub 17 similar to hub 13 which defines an opening through which a conductor end may be brought into the block and with a groove 18 complementary to groove 15 in base 5. As will be seen from Fig. 3, the inner ends of hubs 13 and 17 are spaced to provide an annular passage through which wire ends may pass.

In assembling the cord set, the ends of cables 2 and 3 are passed through the openings defined by hubs 13 and 17 and the bared ends of the wires of the three cables are twisted together to form the correct connections after the manner shown in Fig. 2. The twisted-together wire ends are then fanned out radially to position the several groups of connected wires in grooves 14 and so they extend across the tops of pockets 9. At this time, cable 1 is positioned in groove 15. Next, cap 6 is positioned over base 5 and the base and cap are forced together to bring projections 16 into pockets 9. In entering the pockets, projections 16 carry the twisted-together wire end with them, clamping the wire ends tightly between the sides of the projections and the side walls of the pockets. After being forced together, the base and cap are fastened together by the rivets 7.

Grooves 15 and 18 may be provided with wedge-shaped projections 19 for gripping cable 1 to form a strain relief for it. As shown in Fig. 3, the individual wires of the cables have a substantially right angle turn when they pass between the inner ends of hubs 13 and 17 and they are more or less gripped by such hubs, thus forming a strain relief for cables 2 and 3.

By my invention, I am enabled to connect together the several wires of a plurality of cables to form a cord set in an entirely satisfactory manner without the use of binding screws or soldering. And it will be seen that the junction block comprises only two relatively simple molded parts and the rivets needed to hold them together. As a result, the cables may be connected together at low cost with respect both to parts and labor cost of assembly.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

A junction block for connecting together the wires of a plurality of multiple conductor cables comprising a circular base having an end wall, an outer side wall, an inner wall concentric with and spaced from the side wall and radial partition walls between said outer side wall and said inner wall, said walls defining a central chamber and a plurality of circumferentially spaced pockets surrounding it, a circular cap on the base having projections located in the pockets whereby wire ends may be clamped in the pockets by said projections, and hubs at the centers of the end wall and the cap which define passages through which multiple conductor cable ends may extend into said chamber from opposite sides thereof, said hubs terminating in spaced relation to each other within the chamber to define an annular space for the right angular extension of wire ends to said pockets, and said circular base having walls which define at least one radial passage through which a multiple conductor cable end may extend into said chamber.

GEORGE B. BENANDER.

REFERENCES CITED

The following references are of record in the file of this patent:

UNITED STATES PATENTS

| Number | Name | Date |
|---|---|---|
| 1,953,966 | Lynch | Apr. 10, 1934 |

FOREIGN PATENTS

| Number | Country | Date |
|---|---|---|
| 166,615 | Great Britain | July 18, 1921 |